US011997314B2

(12) United States Patent
Lyu et al.

(10) Patent No.: US 11,997,314 B2
(45) Date of Patent: May 28, 2024

(54) VIDEO STREAM PROCESSING METHOD AND APPARATUS, AND ELECTRONIC DEVICE AND COMPUTER-READABLE MEDIUM

(71) Applicant: ALIBABA GROUP HOLDING LIMITED, George Town (KY)

(72) Inventors: Niqi Lyu, Hangzhou (CN); Zhiming Wang, Hangzhou (CN); Liang You, Hangzhou (CN); Xin Long, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 58 days.

(21) Appl. No.: 17/956,156

(22) Filed: Sep. 29, 2022

(65) Prior Publication Data
US 2023/0034764 A1 Feb. 2, 2023

Related U.S. Application Data

(63) Continuation of application No. PCT/CN2021/082611, filed on Mar. 24, 2021.

(30) Foreign Application Priority Data

Mar. 31, 2020 (CN) .......................... 202010244868.1

(51) Int. Cl.
*H04N 7/12* (2006.01)
*H04N 19/127* (2014.01)
(Continued)

(52) U.S. Cl.
CPC ......... *H04N 19/593* (2014.11); *H04N 19/127* (2014.11); *H04N 19/182* (2014.11);
(Continued)

(58) Field of Classification Search
CPC ............................ H04N 19/127; H04N 19/85
See application file for complete search history.

(56) References Cited

U.S. PATENT DOCUMENTS 7,412,149 B2   8/2008   Cohen et al.
8,228,982 B2   7/2012   Qian et al.
(Continued)

FOREIGN PATENT DOCUMENTS

CN   105827976 A   8/2016
CN   106204488 A   12/2016
(Continued)

OTHER PUBLICATIONS

First Search for Chinese Application No. 202010244868.1 dated Aug. 12, 2022.
(Continued)

*Primary Examiner* — Y Lee

(57) ABSTRACT

Provided are a video stream processing method and apparatus, an electronic device and a computer-readable medium, which relate to the field of Internet technology. An exemplary method includes: storing a video frame in an original video stream in a first buffer area by calling a video stream processing interface of a video stream processing tool; processing the video frame in the first buffer area by means of a video frame processing model to obtain a processed video frame; and on the basis of the processed video frame, generating a standard video stream corresponding to the original video stream. By means of the embodiments of the this application, the software complexity of video stream processing is effectively reduced, and the speed of video stream processing is effectively improved.

18 Claims, 7 Drawing Sheets

(51) Int. Cl.
*H04N 19/182* (2014.01)
*H04N 19/593* (2014.01)
*H04N 19/85* (2014.01)
H04N 21/234 (2011.01)
H04N 21/81 (2011.01)

(52) U.S. Cl.
CPC .......... *H04N 19/85* (2014.11); *H04N 21/234* (2013.01); *H04N 21/8193* (2013.01)

(56) References Cited

U.S. PATENT DOCUMENTS

| | | | |
|---|---|---|---|
| 8,860,779 | B2 | 10/2014 | Chen et al. |
| 9,819,717 | B2 | 11/2017 | Oyman et al. |
| 9,832,498 | B2 | 11/2017 | Calvert |
| 9,986,221 | B2 | 5/2018 | Zhou |
| 9,992,555 | B2 | 6/2018 | Chen et al. |
| 10,972,519 | B2 | 4/2021 | Bar-mashiah et al. |
| 2006/0224763 | A1 | 10/2006 | Altunbasak et al. |
| 2008/0022007 | A1 | 1/2008 | Hostyn et al. |
| 2008/0022350 | A1 | 1/2008 | Hostyn et al. |
| 2008/0259799 | A1 | 10/2008 | Van Beek |
| 2010/0329337 | A1 | 12/2010 | Mulroy |
| 2011/0289543 | A1 | 11/2011 | Goosen et al. |
| 2011/0289544 | A1 | 11/2011 | Goosen et al. |
| 2014/0359678 | A1 | 12/2014 | Shivadas et al. |
| 2015/0373075 | A1 | 12/2015 | Perlman et al. |
| 2017/0302719 | A1 | 10/2017 | Chen et al. |
| 2018/0098131 | A1 | 4/2018 | Zhou |
| 2018/0316928 | A1 | 11/2018 | Jain et al. |
| 2019/0364345 | A1 | 11/2019 | Gilson |
| 2020/0059706 | A1 | 2/2020 | Shivadas et al. |
| 2020/0202479 | A1 | 6/2020 | Li et al. |
| 2021/0044639 | A1 | 2/2021 | Tielemans et al. |

FOREIGN PATENT DOCUMENTS

| | | |
|---|---|---|
| CN | 106507204 A | 3/2017 |
| CN | 107295285 A | 10/2017 |
| CN | 108810085 A | 11/2018 |
| CN | 108881916 A | 11/2018 |
| CN | 109672931 A | 4/2019 |

OTHER PUBLICATIONS

Written Opinion and International Search Report for PCT Application No. PCT/CN2021/082611 dated Jun. 15, 2021.
Extended European Search Report for European Patent Application No. 21781084.5 dated Jun. 1, 2023.
Isovic et al., "Quality aware MPEG-2 Stream Adaptation in Resource Constrained Systems," Proceedings of the 12th Euromicro Conference On Real-Time Systems, Jan. 1, 2004.
Ma et al., "Workflow description for transcoding based Q-STAR and R-STAR models in NBMP," Jan. 13, 2019.
Shenoy et al., "Chapter Ten: Multimedia Storage Servers," Readings in Multimedia Computing and Networking, Aug. 10, 2001.

VIDEO STREAM PROCESSING METHOD AND APPARATUS, AND ELECTRONIC DEVICE AND COMPUTER-READABLE MEDIUM

CROSS-REFERENCE TO RELATED APPLICATIONS

This application is a continuation application of International Patent Application No. PCT/CN2021/082611, which claims priority to Chinese Patent Application No. 202010244868.1, entitled "VIDEO STREAM PROCESSING METHOD AND APPARATUS, AND ELECTRONIC DEVICE AND COMPUTER-READABLE MEDIUM" filed on Mar. 31, 2020. The entire contents of all of the above referenced applications are incorporated herein by reference.

TECHNICAL FIELD

Embodiments of this application relate to the field of Internet technologies, and in particular, to a video stream processing method and apparatus, an electronic device, and a computer-readable medium.

BACKGROUND

With the development of computer technology and Internet technology, more and more users need to process audios and videos recorded personally or recorded according to work requirements in more occasions, for example, pitch shifting, adding background music, audio conversion, and editing and replaying video materials. Currently, many software and technologies for audio and video processing are available on the market, such as FFmpeg (Fast Forward MPEG, which is an open source, free, cross-platform video and audio streaming solution) technology. FFmpeg is a set of open source computer programs that can be used for recording and converting digital audios and videos, to convert the digital audios and videos into streams. FFmpeg is provided with a Lesser General Public License (LGPL) or a General Public License (GPL). FFmpeg provides a complete solution for recording, converting and streaming audios and videos, and contains an advanced audio/video codec library libavcodec. Because FFmpeg supports a variety of encoding and decoding formats, and many developers implement various functions such as video encoding and decoding, picture scaling, and picture synthesis based on FFmpeg, FFmpeg is widely used in various video playback software. For example, in video streaming application software, many services use FFmpeg as a basic framework for video encoding and decoding and video processing. In another example, in a live streaming scenario, after being read from a network acquisition device, a video stream is decoded into original video frames by using FFmpeg, and the original video frames are then re-encoded into a new video stream after frame processing.

With the development of deep learning, videos increasingly rely on different deep learning models for video processing. For example, in scenarios such as narrow-band high-definition transmission, operations such as target recognition and image enhancement need to be performed on different parts of a video frame image. However, conventional image transformation supported in FFmpeg cannot support deep learning models to perform video processing. Therefore, a common processing manner in the industry includes: saving decoded original video frames as images frame by frame, processing the images by using a deep learning model, and then re-encoding the processed images into a video. For example, as shown in FIG. 1A, an inputted video stream is decoded by using FFmpeg to obtain original video frames, and the original video frames are saved as images frame by frame and stored in a disk; then, the images are read from the disk, and processed by using a deep learning model to obtain processed images; and then, the processed images are re-encoded into a video by using FFmpeg. In such a processing manner, the entire processing procedure is dispersed in different software modules, which increases the software complexity of video stream processing. For example, PPmpeg is responsible for decoding a video stream into an original video frames and encoding inferred images into a video, and model inference is completed by a tensorRT framework or a tensorflow framework. In addition, the original video frames are saved as images frame by frame and stored in a disk, and the images are read from the disk, which reduces the speed of video stream processing.

Therefore, how to reduce the software complexity of video stream processing and improve the speed of the video stream processing has become an urgent technical problem to be solved currently.

SUMMARY

Objectives of this application are to provide a video stream processing method and apparatus, an electronic device, and a computer-readable medium, to resolve the technical problems of how to reduce the software complexity of video stream processing and improve the speed of video stream processing in existing technologies.

In some aspects, the techniques described herein relate to a video stream processing method, including: obtaining a video frame processing model trained to perform inferences on given video frames; preprocessing video frames of a first video stream to obtain video frames adapted to the video frame processing model; storing the video frames adapted to the video frame processing model in a first buffer area; processing the video frames in the first buffer area by using the video frame processing model to obtain processed video frames; and generating, based on the processed video frames, a second video stream corresponding to the first video stream.

In some aspects, the preprocessing the video frames of the first video stream includes: preforming value domain scaling on pixel values of pixel points in the video frames of the first video stream, to obtain the video frames adapted to the video frame processing model.

In some aspects, before the processing the video frames in the first buffer area by using the video frame processing model, the method further includes: determining, based on a decoding duration of a next video frame of the video frames, a batch size for batch processing the video frames in the first buffer area by the video frame processing model, and the processing the video frames in the first buffer area by using the video frame processing model includes: performing batch processing on the video frames in the first buffer area by using the video frame processing model according to the determined batch size, to obtain batch-processed video frames.

In some aspects, before the determining the batch size for batch processing the video frames in the first buffer area, the method further includes: determining, when decoding video frames in a group of pictures of the first video stream, the decoding duration of the next video frame according to information of the group of pictures.

In some aspects, the information of the group of pictures includes a frame type of the next video frame of the video frames, and the determining the decoding duration of the next video frame according to information of the group of pictures includes: determining, when the frame type of the next video frame is a first intra-frame coding frame, that the decoding duration of the next video frame is a decoding duration of the first intra-frame coding frame; determining, when the frame type of the next video frame is a first forward predictive coding frame, that the decoding duration of the next video frame is a decoding duration of the first forward predictive coding frame; and determining, when the frame type of the next video frame is a bidirectional predictive interpolation coding frame, the decoding duration of the next video frame of the video frames according to a frame type of a video frame following the next video frame.

In some aspects, the determining the decoding duration of the next video frame of the video frames according to the frame type of the video frame following the next video frame includes: determining, when the frame type of the video frame following the next video frame of the video frames is a second intra-frame coding frame, that the decoding duration of the next video frame of the video frames is a sum of a decoding duration of the second intra-frame coding frame and a decoding duration of the bidirectional predictive interpolation coding frame; and determining, when the frame type of the video frame following the next video frame of the video frames is a second forward predictive coding frame, that the decoding duration of the next video frame of the video frames is a sum of a decoding duration of the second forward predictive coding frame and the decoding duration of the bidirectional predictive interpolation coding frame.

In some aspects, the determining, based on a decoding duration of a next video frame of the video frames, the batch size of batch processing performed by using the video frame processing model on the video frames in the first buffer area includes: determining, based on the decoding duration of the next video frame, a preprocessing duration of the next video frame, a first timestamp at which the video frames are stored in the first buffer area, and a second timestamp at which the next video frame is stored in the first buffer area; determining a quantity of video frames in the first buffer area when the next video frame is stored in the first buffer area, and a duration for which the video frame processing model performs batch processing on the video frames in the first buffer area by using the quantity as the batch size; determining, based on the second timestamp and the duration, a third timestamp at which the video frame processing model completes batch processing on the video frames in the first buffer area by using the quantity as the batch size; and determining that the batch size of batch processing performed by using the video frame processing model on the video frames in the first buffer area is the quantity, if a difference between the third timestamp and a minimum timestamp at which preprocessing of the video frames in the first buffer area is completed when the next video frame is stored in the first buffer area is greater than or equal to a maximum processing duration of the video frame processing model.

In some aspects, the method further includes: waiting for the video frame following the next video frame to be stored in the first buffer area if the difference is less than the maximum processing duration.

In some aspects, after the performing batch processing on the video frames in the first buffer area by using the video frame processing model according to the determined batch size, the method further includes: storing the batch-processed video frames in a second buffer area; retrieving the batch-processed video frames from the second buffer area; and postprocessing the batch-processed video frames retrieved from the second buffer area, to recover a data format of the batch-processed video frames to a video image data format.

In some aspects, the postprocessing the batch-processed video frames retrieved from the second buffer area includes: performing value domain scaling on pixel values of pixel points in the batch-processed video frames retrieved from the second buffer area, to recover the data format of the batch-processed video frames to the video image data format.

In some aspects, the generating, based on the processed video frames, a second video stream corresponding to the first video stream includes: encoding the batch-processed video frames whose data format is recovered to the video image data format, to obtain the second video stream corresponding to the first video stream.

In some aspects, the techniques described herein relate to a non-transitory computer-readable storage medium configured with instructions executable by one or more processors to cause the one or more processors to perform operations including: obtaining a video frame processing model trained to perform inferences on given video frames; preprocessing video frames of a first video stream to obtain video frames adapted to the video frame processing model; storing the video frames adapted to the video frame processing model in a first buffer area processing the video frames in the first buffer area by using the video frame processing model to obtain processed video frames; and generating, based on the processed video frames, a second video stream corresponding to the first video stream.

In some aspects, the techniques described herein relate to a system including one or more processors and one or more non-transitory computer-readable storage media storing instructions executable by the one or more processors to cause the system to perform operations including: obtaining a video frame processing model trained to perform inferences on given video frames; preprocessing video frames of a first video stream to obtain video frames adapted to the video frame processing model; storing the video frames adapted to the video frame processing model in a first buffer area processing the video frames in the first buffer area by using the video frame processing model to obtain processed video frames; and generating, based on the processed video frames, a second video stream corresponding to the first video stream.

According to the video stream processing solution provided in the embodiments of this application, video frames of an original video stream are stored in a first buffer area by calling a video stream processing interface of a video stream processing tool; the video frames in the first buffer area are processed by using a video frame processing model, to obtain processed video frames; and a standard video stream corresponding to the original video stream is generated based on the processed video frames. Compared with existing other manners, the video stream is processed by calling the video stream processing interface of the video stream processing tool, which effectively reduces the software complexity of video stream processing, and further improves the speed of video stream processing. In addition, the video frames of the original video stream are stored in the first buffer area, and there is no need to additionally save the video frames as images and read the images, which ensures the quality of the video frames and also improve the speed of entire video stream processing.

BRIEF DESCRIPTION OF THE DRAWINGS

Other features, objectives, and advantages of this application become more obvious by reading the detailed description of non-limiting embodiments that is provided with reference to the following accompanying drawings.

DETAILED DESCRIPTION

This application is further described in detail below with reference to the accompanying drawings and embodiments. It may be understood that specific embodiments described herein are only configured to explain a related application, but not to limit this application. In addition, it should be further noted that, for ease of description, the accompanying drawings only show parts relevant to the related application.

It should be noted that, the embodiments in this application and features in the embodiments may be combined with each other in the case of no conflict. This application is described in detail below with reference to the drawings and the embodiments.

Figure 1A:
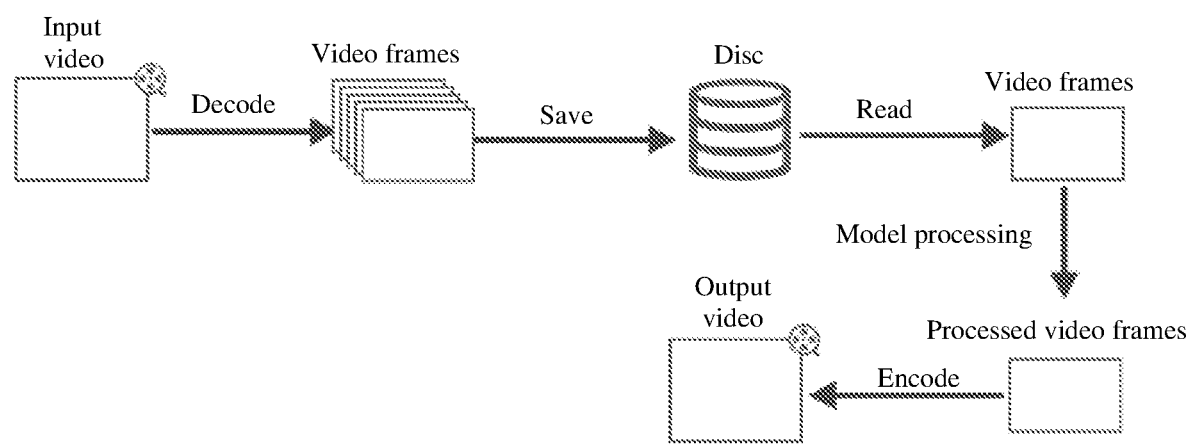
FIG. 1A is a schematic diagram of a video stream processing process in existing technologies in accordance with some embodiments.
Figure 1B:
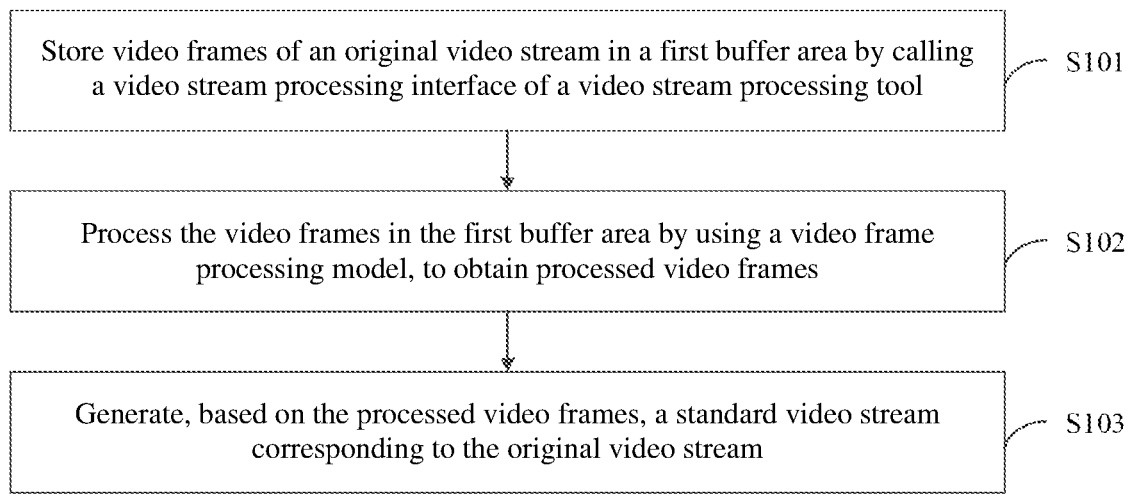
FIG. 1B is a flowchart of steps of a video stream processing method according to Embodiment 1 of this application.

FIG. 1B is a flowchart of steps of a video stream processing method according to Embodiment 1 of this application.

For example, the video stream processing method provided in this embodiment includes the following steps.

In step S101, video frames of an original video stream are stored in a first buffer area by calling a video stream processing interface of a video stream processing tool.

In some embodiments, the video stream processing tool may be an FFmpeg (Fast Forward MPEG, which is an open source, free, cross-platform video and audio streaming solution) tool. The video stream processing interface may be an interface of a video filter of the FFmpeg tool. For example, a software module for implementing the video stream processing method provided in this embodiment of this application is embedded in the FFmpeg tool as the video filter of the FFmpeg tool, that is, the interface of the video filter of the FFmpeg tool is used for implementing the software module of the video stream processing method. The video filter may be construed as a filter for performing various changes on a video frame, for example, scaling, rotation, color transformation, filtering, and other operations. The original video stream may be an original video stream acquired by a network acquisition device, for example, an original video stream acquired by a camera of a mobile phone terminal, an original video stream acquired by a camera of a tablet computer, or an original video stream acquired by a surveillance camera. The first buffer area may be a buffer queue. It may be understood that the foregoing description is only exemplary, and this is not limited in this embodiment of this application.

In some optional embodiments, before the storing video frames of an original video stream in a first buffer area, the method further includes: preprocessing the video frames of the original video stream, to obtain video frames adapted to the video frame processing model, and the storing video frames of an original video stream in a first buffer area includes: storing the video frames adapted to the video frame processing model in the first buffer area. Therefore, the video frames of the original video stream are preprocessed, so that the video frames adapted to the video frame processing model can be obtained. It may be understood that the foregoing description is only exemplary, and this is not limited in this embodiment of this application.

For example, when the video frames of the original video stream are preprocessed, value domain scaling is performed on pixel values of pixel points in the video frames of the original video stream, to obtain the video frames adapted to the video frame processing model. Therefore, value domain scaling is performed on the pixel values of the pixel points in the video frames of the original video stream, so that the video frames adapted to the video frame processing model can be obtained. It may be understood that the foregoing description is only exemplary, and this is not limited in this embodiment of this application.

For example, when a video frame processing model is trained, pixel values of pixel points of an inputted video frame sample are normally distributed, so that the video frame processing model converges more easily in training After the video frame processing model converges in training, pixel values of pixel points of an inputted to-be-processed video frame are also expected to be normally distributed in an actual scenario. Therefore, the video frames may be preprocessed, to obtain video frames adapted to the video frame processing model. It may be understood that the foregoing description is only exemplary, and this is not limited in this embodiment of this application.

In step S102, the video frames in the first buffer area are processed by using the video frame processing model, to obtain processed video frames.

In some embodiments, the video frame processing model may be construed as a neural network model for processing video frames, for example, an image enhancement model, an image super-resolution model, or an image beauty model. The processing performed by the video frame processing model on the video frames may be construed as inference performed the video frame processing model on the video frames. For example, after the training of the video frame processing model is completed, the video frame processing model needs to be deployed in a scenario of video frame processing. A video frame in an actual scenario is used for prediction, and this process is the inference of the video frame processing model. It may be understood that the foregoing description is only exemplary, and this is not limited in this embodiment of this application.

In some embodiments, after the processing the video frames in the first buffer area by using the video frame processing model, the method further includes: storing the processed video frames in a second buffer area; retrieving the processed video frames from the second buffer area; and postprocessing the processed video frames retrieved from the second buffer area, to recover a data format of the processed video frames to a video image data format. Therefore, the processed video frames retrieved from the second buffer area are postprocessed, so that the data format of the processed video frame can be recovered to the video image data format, thereby facilitating subsequent encoding and compression of the processed video frames. It may be understood that the foregoing description is only exemplary, and this is not limited in this embodiment of this application.

For example, when the processed video frames retrieved from the second buffer area are postprocessed, value domain scaling is performed on pixel values of pixel points in the processed video frames retrieved from the second buffer area, to recover the data format of the processed video frames to the video image data format. Therefore, value domain scaling is performed on the pixel values of the pixel points in the processed video frames retrieved from the second buffer area, so that the data format of the processed video frames can be recovered to the video image data format, thereby facilitating subsequent encoding and compression of the processed video frames. It may be understood that the foregoing description is only exemplary, and this is not limited in this embodiment of this application.

For example, when the pixel values of the pixel points in the processed video frames are not in a normal range, the processed video frames needs to be postprocessed, and the pixel values of the pixel points in the processed video frames are restored to the normal range. Then, the data format of the video frames with restored pixel values are recovered to the video image data format. It may be understood that the foregoing description is only exemplary, and this is not limited in this embodiment of this application.

In step S103, a standard video stream corresponding to the original video stream is generated based on the processed video frames.

In some optional embodiments, when the standard video stream corresponding to the original video stream is generated based on the processed video frames. The processed video frames whose data format is recovered to the video image data format are encoded, to obtain the standard video stream corresponding to the original video stream. The video image data format may be a YUV data format or an RGB data format. It may be understood that the foregoing description is only exemplary, and this is not limited in this embodiment of this application.

Figure 1C:
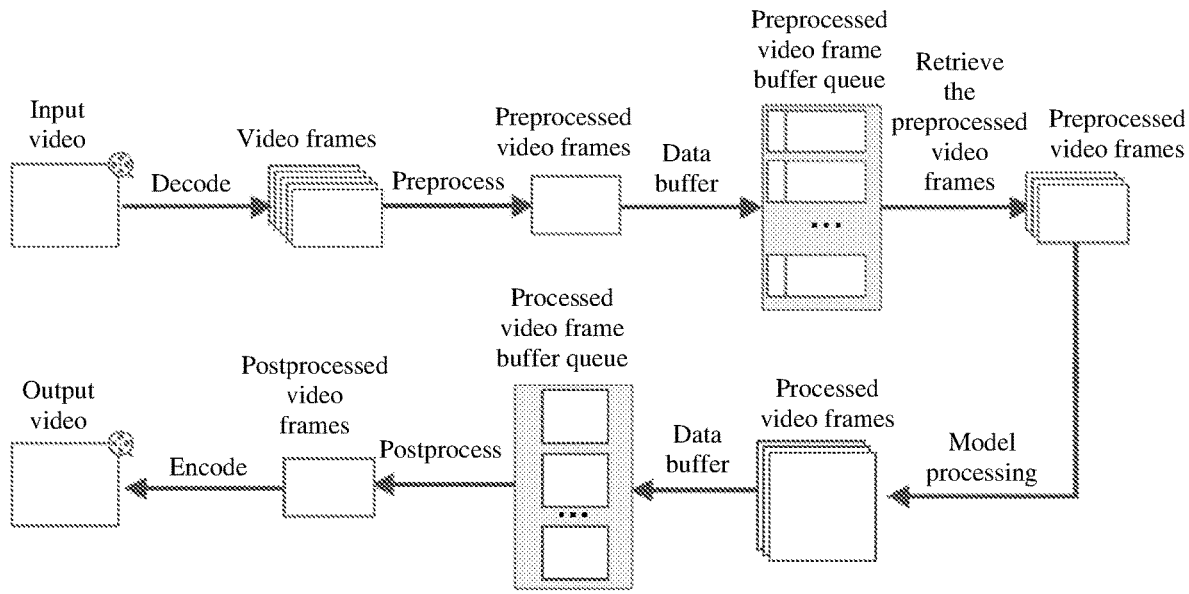
FIG. 1C is a schematic diagram of a video stream processing process according to Embodiment 1 of this application.

For example, as shown in FIG. 1C, an inputted original video stream is decoded, to obtain video frames in the original video stream. After the video frames of the original video stream are obtained, the video frames are preprocessed, to obtain preprocessed video frames. After the preprocessed video frames are obtained, the preprocessed video frames are stored in a preprocessed video frame buffer queue. Then, the preprocessed video frames are retrieved from the preprocessed video frame buffer queue, and processed by using a video frame processing model, to obtain processed video frames. The processed video frames are stored in a processed video frame buffer queue. Then, the processed video frames are retrieved from the processed video frame buffer queue, and the processed video frames are postprocessed, to obtain postprocessed video frames. Finally, the postprocessed video frames are encoded, to obtain a standard video stream corresponding to the original video stream. It may be understood that the foregoing description is only exemplary, and this is not limited in this embodiment of this application.

According to the video stream processing method provided in the embodiments of this application, video frames of an original video stream are stored in a first buffer area by calling a video stream processing interface of a video stream processing tool; the video frames in the first buffer area are processed by using a video frame processing model, to obtain processed video frames; and a standard video stream corresponding to the original video stream is generated based on the processed video frames. Compared with existing other manners, the video stream is processed by calling the video stream processing interface of the video stream processing tool, which effectively reduces the software complexity of video stream processing, and further improves the speed of video stream processing. In addition, the video frames of the original video stream are stored in the first buffer area, and there is no need to additionally save the video frames as images and read the images, which ensures the quality of the video frames and also improve the speed of entire video stream processing.

The video stream processing method of this embodiment may be performed by any suitable device having a data processing capability, which includes, but is not limited to, a camera, a terminal, a mobile terminal, a PC, a server, an in-vehicle device, an entertainment device, an advertising device, a personal digital assistant (PDA), a tablet computer, a notebook computer, a handheld game console, glasses, a watch, a wearable device, a virtual display device, a display enhancement device, or the like.

Figure 2A:
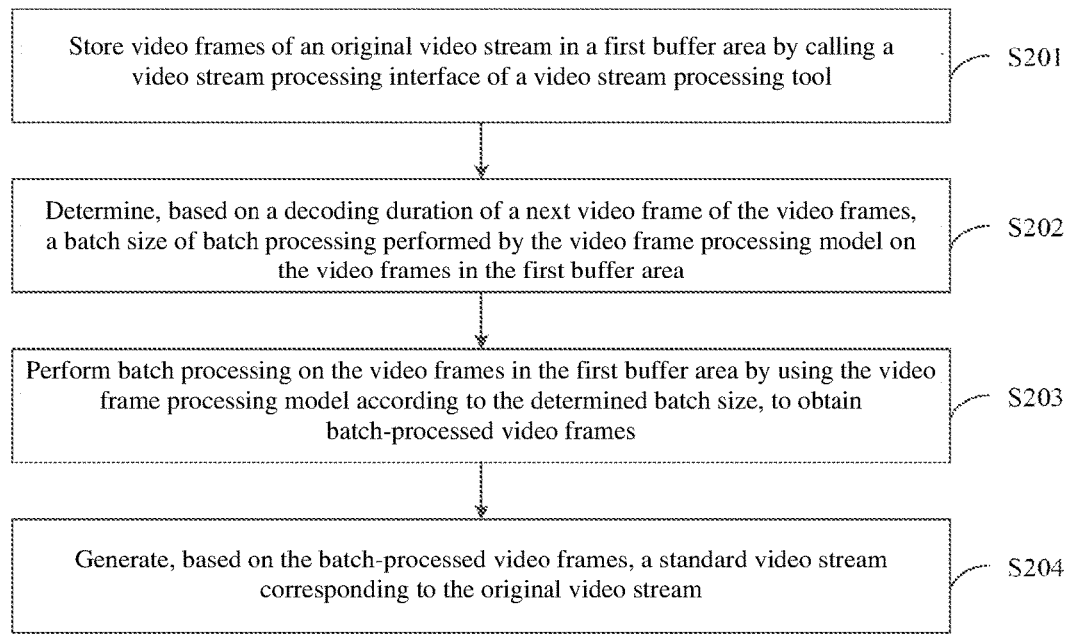
FIG. 2A is a flowchart of steps of a video stream processing method according to Embodiment 2 of this application.

FIG. 2A is a flowchart of steps of a video stream processing method according to Embodiment 2 of this application.

For example, the video stream processing method provided in this embodiment includes the following steps.

In step S201, video frames of an original video stream are stored in a first buffer area by calling a video stream processing interface of a video stream processing tool.

In some embodiments, the video stream processing tool may be an FFmpeg (Fast Forward MPEG, which is an open source, free, cross-platform video and audio streaming solution) tool. The video stream processing interface may be an interface of a video filter of the FFmpeg tool. For example, a software module for implementing the video stream processing method provided in this embodiment of this application is embedded in the FFmpeg tool as the video filter of the FFmpeg tool, that is, the interface of the video filter of the FFmpeg tool is used for implementing the software module of the video stream processing method. The video filter may be understood as a filter for performing various changes on a video frame, for example, scaling, rotation, color transformation, filtering, and other operations. The original video stream may be an original video stream acquired by a network acquisition device, for example, an original video stream acquired by a camera of a mobile phone terminal, an original video stream acquired by a camera of a tablet computer, or an original video stream acquired by a surveillance camera. The first buffer area may be a buffer queue. It may be understood that the foregoing description is only exemplary, and this is not limited in this embodiment of this application.

In some embodiments, before the storing video frames of an original video stream in a first buffer area, the method further includes: preprocessing the video frames of the original video stream, to obtain video frames adapted to the video frame processing model, and the storing video frames of an original video stream in a first buffer area includes: storing the video frames adapted to the video frame processing model in the first buffer area. Therefore, the video frames of the original video stream are preprocessed, so that the video frames adapted to the video frame processing model can be obtained. It may be understood that the foregoing description is only exemplary, and this is not limited in this embodiment of this application.

For example, when the video frames of the original video stream are preprocessed, value domain scaling is performed on pixel values of pixel points in the video frames of the original video stream, to obtain the video frames adapted to the video frame processing model. Therefore, value domain scaling is performed on the pixel values of the pixel points in the video frames of the original video stream, so that the video frames adapted to the video frame processing model can be obtained. It may be understood that the foregoing description is only exemplary, and this is not limited in this embodiment of this application.

For example, when a video frame processing model is trained, pixel values of pixel points of an inputted video frame sample are normally distributed, so that the video frame processing model converges more easily in training After the video frame processing model converges in training, pixel values of pixel points of an inputted to-be-processed video frame are also expected to be normally distributed in an actual scenario. Therefore, the video frame may be preprocessed, to obtain video frames adapted to the video frame processing model. It may be understood that the foregoing description is only exemplary, and this is not limited in this embodiment of this application.

In step S202, a batch size of batch processing performed by the video frame processing model on the video frames in the first buffer area is determined based on a decoding duration of a next video frame of the video frames.

In some embodiments, the batch processing may be construed as batch processing for the video frames in the first buffer area. The video frame processing model performs batch processing on the video frames in the first buffer area, which achieves higher processing efficiency and lower average processing time. The video frame processing model may be construed as a neural network model for processing video frames, for example, an image enhancement model, an image super-resolution model, or an image beauty model. It may be understood that the foregoing description is only exemplary, and this is not limited in this embodiment of this application.

In some embodiments, before the determining a batch size of batch processing performed by the video frame processing model on the video frames in the first buffer area, the method further includes: determining, when decoding the video frames in a group of pictures (GoP) of the original video stream, the decoding duration of the next video frame according to information of the group of pictures. The group of pictures may be construed as a group of continuous pictures formed by one I frame and a plurality of B frames/P frames, that is, a video frame sequence of video stream encoding. Therefore, the decoding duration of the next video frame can be accurately determined according to the information of the group of pictures. It may be understood that the foregoing description is only exemplary, and this is not limited in this embodiment of this application.

For example, the information of the group of pictures includes a frame type of the next video frame of the video frames. When the decoding duration of the next video frame is determined according to the information of the group of pictures, if the frame type of the next video frame is an intra-frame coding frame, it is determined that the decoding duration of the next video frame is a decoding duration of the intra-frame coding frame; if the frame type of the next video frame is a forward predictive coding frame, it is determined that the decoding duration of the next video frame is a decoding duration of the forward predictive coding frame; and if the frame type of the next video frame is a bidirectional predictive interpolation coding frame, the decoding duration of the next video frame of the video frames is determined according to a frame type of a video frame following the next video frame. The decoding duration of the intra-frame coding frame and the decoding duration of the forward predictive coding frame are collected in advance and configured. It may be understood that the foregoing description is only exemplary, and this is not limited in this embodiment of this application.

For example, when the decoding duration of the next video frame of the video frames is determined according to the frame type of the video frame following the next video frame, if the frame type of the video frame following the next video frame of the video frames is an intra-frame coding frame, it is determined that the decoding duration of the next video frame of the video frames is a sum of a decoding duration of the intra-frame coding frame and a decoding duration of the bidirectional predictive interpolation coding frame; and if the frame type of the video frame following the next video frame of the video frames is a forward predictive coding frame, it is determined that the decoding duration of the next video frame of the video frames is a sum of a decoding duration of the forward predictive coding frame and a decoding duration of the bidirectional predictive interpolation coding frame. The decoding duration of the bidirectional predictive interpolation coding frame is collected in advance and configured. It may be understood that the foregoing description is only exemplary, and this is not limited in this embodiment of this application.

Different from other data, data of the video stream has a unique characteristic. Due to a large amount of data, the video stream is generally encoded and compressed to reduce transmission and storage pressure. In an encoding and compression algorithm, video images in the video stream are generally segmented into groups of pictures. In the groups of pictures, different video frame decoding methods result in different delays. By using X264 encoding as an example, video images are encoded into an I frame, a B frame, and a P frame. Due to a characteristic of bidirectional prediction, the B frame cannot be decoded until a next key frame is decoded. Therefore, the encoding characteristic of the video stream needs to be considered, and a decoding duration of video frames in a group of pictures is determined according to a type of the video frames in the group of pictures. The I frame represents the intra-frame coding frame.

The I frame is a key frame, and does not need to rely on other frames for processing during encoding and decoding. The P frame represents the forward predictive coding frame, which records difference information between the P frame and a previous I frame or P frame, and relies on the previous I frame or P frame during encoding and decoding. The B frame represents the bidirectional predictive interpolation coding frame, which contains difference information between the frame and previous and next frames, and needs to rely on the previous key frame (I frame or P frame) and the next key frame (I frame or P frame) for encoding and decoding. It may be understood that the foregoing description is only exemplary, and this is not limited in this embodiment of this application.

In some embodiments, when the batch size of batch processing performed by the video frame processing model on the video frames in the first buffer area is determined based on the decoding duration of the next video frame of the video frames, a second timestamp at which the next video frame is stored in the first buffer area is determined based on the decoding duration of the next video frame, a preprocessing duration of the next video frame, and a first timestamp at which the video frames are stored in the first buffer area; a quantity of video frames in the first buffer area when the next video frame is stored in the first buffer area and a duration for which the video frame processing model performs batch processing on the video frames in the first buffer area by using the quantity as the batch size are determined; a third timestamp at which the video frame processing model completes batch processing on the video frames in the first buffer area by using the quantity as the batch size is determined based on the second timestamp and the duration; and if a difference between the third timestamp and a minimum timestamp at which preprocessing of the video frames in the first buffer area is completed when the next video frame is stored in the first buffer area is greater than or equal to a preset maximum processing duration of the video frame processing model, it is determined that the batch size of batch processing performed by the video frame processing model on the video frames in the first buffer area is the quantity. The preprocessing duration and batch processing durations of the video frame processing model under different batch sizes are collected in advance and configured. Therefore, the batch size of batch processing performed by the video frame processing model on the video frames in the first buffer area can be adaptively determined based on the decoding duration of the next video frame of the video frames. It may be understood that the foregoing description is only exemplary, and this is not limited in this embodiment of this application.

For example, the method further includes: waiting for the video frame following the next video frame to be stored in the first buffer area if the difference is less than the maximum processing duration, until a waiting duration is equal to a difference between the maximum processing duration and the difference. It may be understood that the foregoing description is only exemplary, and this is not limited in this embodiment of this application.

In step S203, batch processing is performed on the video frames in the first buffer area by using the video frame processing model according to the determined batch size, to obtain batch-processed video frames.

In some embodiments, after the performing batch processing on the video frames in the first buffer area by using the video frame processing model according to the determined batch size, the method further includes: storing the batch-processed video frames in a second buffer area; retrieving the batch-processed video frames from the second buffer area; and postprocessing the batch-processed video frames retrieved from the second buffer area, to recover a data format of the batch-processed video frames to a video image data format. Therefore, the batch-processed video frames retrieved from the second buffer area are postprocessed, so that the data format of the batch-processed video frames can be recovered to the video image data format, thereby facilitating subsequent encoding and compression of the batch-processed video frames. It may be understood that the foregoing description is only exemplary, and this is not limited in this embodiment of this application.

For example, when the batch-processed video frames retrieved from the second buffer area are postprocessed, value domain scaling is performed on pixel values of pixel points in the batch-processed video frames retrieved from the second buffer area, to recover the data format of the batch-processed video frames to the video image data format. Therefore, value domain scaling is performed on the pixel values of the pixel points in the batch-processed video frames retrieved from the second buffer area, so that the data format of the batch-processed video frames can be recovered to the video image data format, thereby facilitating subsequent encoding and compression of the batch-processed video frames. It may be understood that the foregoing description is only exemplary, and this is not limited in this embodiment of this application.

For example, when the pixel values of the pixel points in the batch-processed video frames are not in a normal range, the batch-processed video frames need to be postprocessed, and the pixel values of the pixel points in the batch-processed video frames are restored to the normal range. Then, the data format of the video frames with restored pixel values is recovered to the video image data format. It may be understood that the foregoing description is only exemplary, and this is not limited in this embodiment of this application.

In step S204, a standard video stream corresponding to the original video stream is generated based on the batch-processed video frames.

In some embodiments, when the standard video stream corresponding to the original video stream is generated based on the batch-processed video frames, the batch-processed video frames whose data format is recovered to the video image data format is encoded, to obtain the standard video stream corresponding to the original video stream. The video image data format may be a YUV data format or an RGB data format. It may be understood that the foregoing description is only exemplary, and this is not limited in this embodiment of this application.

Figure 2B:
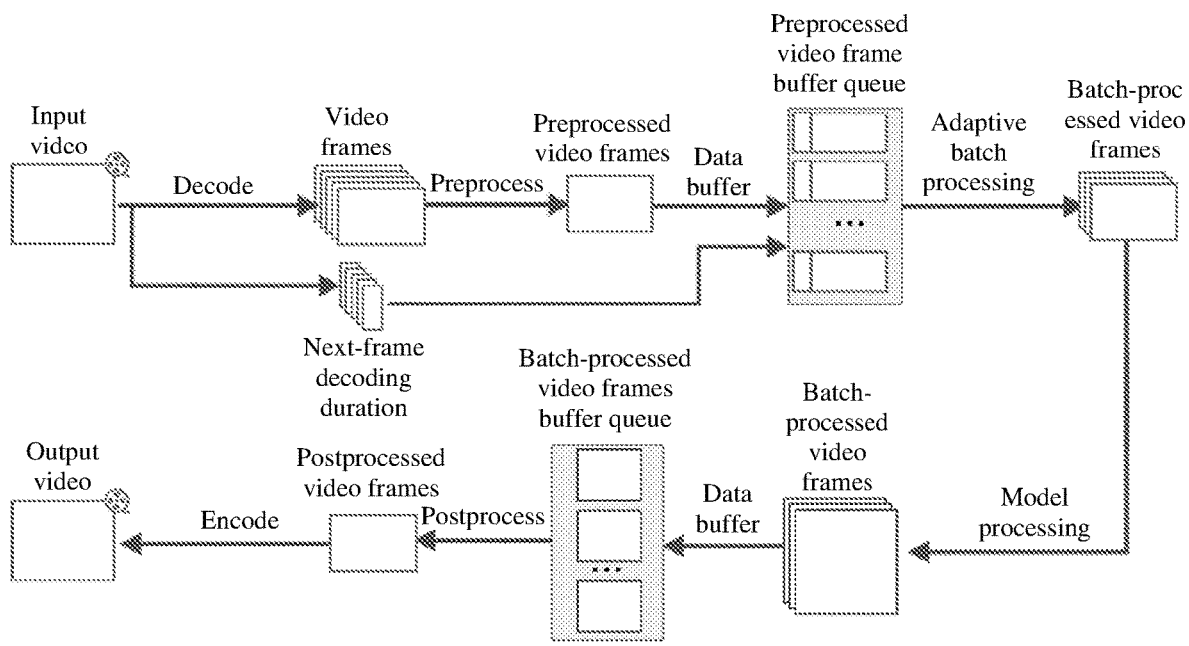
FIG. 2B is a schematic diagram of a video stream processing process according to Embodiment 2 of this application.

For example, because a suitable batch size needs to be adaptively selected, processing durations $t_{process}$ required by the video frame processing model and processing durations $t_{preprocess}$ required by preprocessing under different batch sizes need to be determined in advance. A preprocessing duration of each video frame is $t_{preprocess}$, a decoding duration of the I frame is $t_I$, a decoding duration of the P frame is $t_P$, and a decoding duration of the B frame is $t_B$. In addition, a maximum processing duration $t_{max}$ of the video frame processing model needs to be set. As shown in FIG. 2B, a video stream processing procedure is as follows. First, an inputted original video stream is read. The original video stream is decoded by an h264 decoder of hardware acceleration, and is converted into original video frames. When image frames in each group of pictures are decoded, a decoding duration $t_{decode}$ required by a next video frame image may be calculated according to information of the group of pictures. When the next video frame is a B frame, $t_{decode}$ is a sum of a decoding duration of a next key frame of the B frame and a decoding duration of the B frame.

$$t_{decode} = \begin{cases} t_P + t_B, & \text{If the next key frame of the } B \text{ frame is a } P \text{ frame} \\ t_I + t_B, & \text{If the next key frame of the } B \text{ frame is an } I \text{ frame} \end{cases}$$

When the next video frame is a P frame, $t_{decode}$ is equal to $t_P$. When the next video frame is an I frame, $t_{decode}$ is equal to $t_I$. Then, video frame processing containing model inference of adaptive batch processing is performed. For example, video frames are first preprocessed, including an image processing method, normalization, value domain scaling, and the like. Simultaneously, a timestamp $t_{ready}$ at which preprocessing of the video frames is completed is recorded. After preprocessing is completed, it is waited until a buffer queue Q is not full. When the buffer queue Q is not full, the video frames, a decoding duration $t_{decode}$ of the next video frame of the video frames and the timestamp $t_{ready}$ at which preprocessing of the video frames is completed are stored in the buffer queue by using a processing thread, and a current timestamp $t_{now}$ at which the decoding duration and the timestamp are stored in the buffer queue is recorded. To meet limitation of $t_{max}$ at the current timestamp $t_{now}$, a suitable batch size needs to be adaptively selected for model inference. For example, in the buffer queue Q, after the next video frame of the video frames is stored in the buffer queue Q, a model processing completion timestamp with a length of the buffer queue Q as the batch size may be inferred as follows:

$$t_{finish} = t_{process}[\text{len}(Q)+1] t_{decode}[\text{len}(Q)] + t_{now} + t_{preprocess}$$

If waiting continues, a limitation condition that $t_{finish} - \min_{i \in Q}(i \cdot t_{ready})) < t_{max}$ needs to be met. When the condition is met, a model processing part is suspended, and it is waited until a video frame following the next video frame is stored in the buffer queue Q, or until a waiting duration reaches $t_{max} - (t_{finish} - \min_{i \in Q}(i \cdot t_{ready}))$. Otherwise, a model batch processing operation is performed, and video frames after the model batch processing are stored in another buffer queue. len(Q) is a current length of the buffer queue Q. When the other buffer queue is not empty, the batch-processed video frames are retrieved from the other buffer queue, and a postprocessing operation is performed on the batch-processed video frames, so that a data format of the batch-processed video frames is recovered to a YUV or RGB data format. Finally, a standard video stream is encoded and outputted. The batch-processed video frames whose data format is recovered are encoded into the standard video stream by using an h264 encoder of hardware acceleration. It may be understood that the foregoing description is only exemplary, and this is not limited in this embodiment of this application.

In actual applications, of the above-described adaptive batch processing considers the encoding and decoding characteristics of video frames in video groups, and the fact that a GPU has higher efficiency in the case of a larger batch size. With that, the efficiency and real-time performance of video stream processing is improved. In addition, the video stream processing procedure provided in this embodiment is not combining a machine learning framework with a codec, and the inference performance thereof is higher than that of tensorflow or other frameworks. The video stream processing procedure of this embodiment is not strongly coupled with any machine learning model framework, and is applicable to video stream processing in different scenarios. For example, in an actual live streaming scenario, if a software module designed with the TensorRT framework as a processing framework is combined with a preprocessing part of CUDA (Compute Unified Device Architecture) acceleration, the total acceleration is nearly 7 times that of an original solution. After the combination with adaptive batch processing, another performance gain of 10% to 20% can be further achieved.

Based on Embodiment 1 of this application, a batch size of batch processing performed by the video frame processing model on video frames in the first buffer area is determined based on a decoding duration of a next video frame of the video frames, and batch processing is performed on the video frames in the first buffer area by using the video frame processing model according to the determined batch size, to obtain batch-processed video frames. Compared with existing other manners, the batch size of batch processing performed by the video frame processing model on the video frames in the first buffer area can be adaptively determined based on the decoding duration of the next video frame of the video frames, and batch processing is performed on the video frames in the first buffer area by using the video frame processing module according to the determined batch size, which effectively ensures the real-time performance of video stream processing, and also further improve the speed of entire video stream processing.

The video stream processing method of this embodiment may be performed by any suitable device having a data processing capability, which includes, but is not limited to, a camera, a terminal, a mobile terminal, a PC, a server, an in-vehicle device, an entertainment device, an advertising device, a personal digital assistant (PDA), a tablet computer, a notebook computer, a handheld game console, glasses, a watch, a wearable device, a virtual display device, a display enhancement device, or the like.

Figure 3:
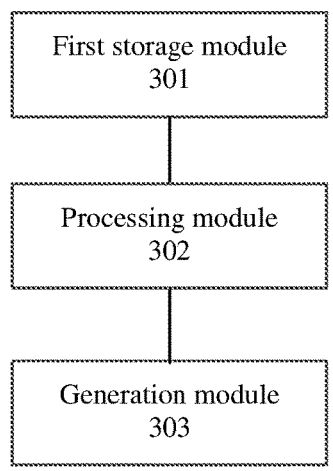
FIG. 3 is a schematic structural diagram of a video stream processing apparatus according to Embodiment 3 of this application.

FIG. 3 is a schematic structural diagram of a video stream processing apparatus according to Embodiment 3 of this application.

The video stream processing apparatus provided in this embodiment includes: a first storage module 301, configured to store video frames of an original video stream in a first buffer area by calling a video stream processing interface of a video stream processing tool; a processing module 302, configured to process the video frames in the first buffer area by using a video frame processing model, to obtain processed video frames; and a generation module 303, configured to generate, based on the processed video frames, a standard video stream corresponding to the original video stream.

The video stream processing apparatus of this embodiment is configured to implement corresponding video stream processing methods in the foregoing method embodiments, and also has beneficial effects of the corresponding method embodiments. Details are not repeated herein.

Figure 4:
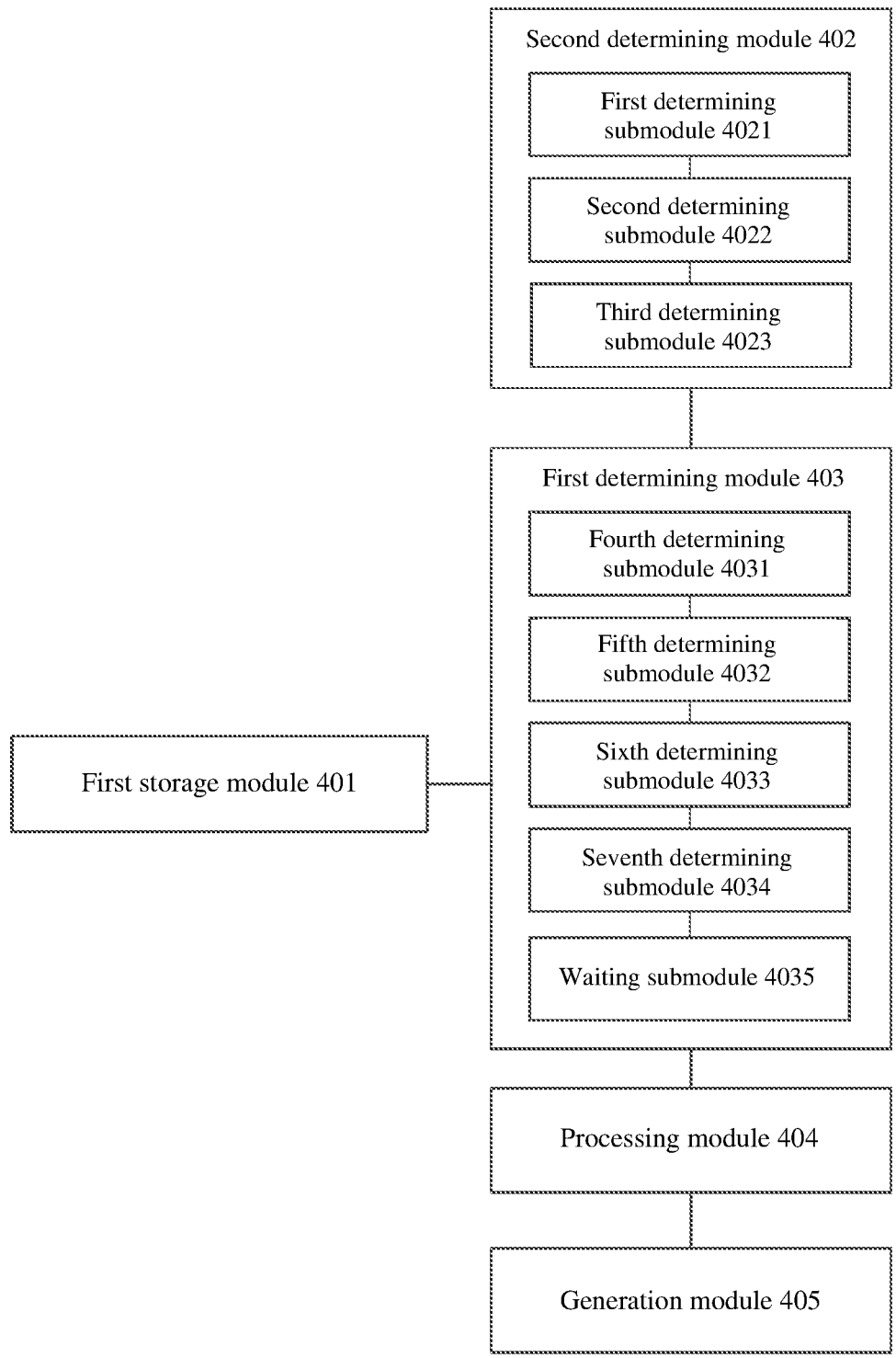
FIG. 4 is a schematic structural diagram of a video stream processing apparatus according to Embodiment 4 of this application.

FIG. 4 is a schematic structural diagram of a video stream processing apparatus according to Embodiment 4 of this application.

The video stream processing apparatus provided in this embodiment includes: a first storage module 401, configured to store video frames of an original video stream in a first buffer area by calling a video stream processing interface of a video stream processing tool; a processing module 404, configured to process the video frames in the first buffer area by using a video frame processing model, to obtain processed video frames; and a generation module 405, configured to generate, based on the processed video frames, a standard video stream corresponding to the original video stream.

In some embodiments, before the processing module 404, the apparatus further includes: a first determining module 403, configured to determine, based on a decoding duration of a next video frame of the video frames, a batch size of batch processing performed by the video frame processing model on the video frames in the first buffer area. The processing module 404 is configured to: perform batch processing on the video frames in the first buffer area by using the video frame processing model according to the determined batch size, to obtain batch-processed video frames.

In some embodiments, before the first determining module 403, the apparatus further includes: a second determining module 402, configured to determine, when decoding the video frames in a group of pictures of the original video stream, the decoding duration of the next video frame according to information of the group of pictures.

In some embodiments, the information of the group of pictures includes a frame type of the next video frame of the video frames. The second determining module 402 includes: a first determining submodule 4021, configured to determine, when the frame type of the next video frame is an intra-frame coding frame, that the decoding duration of the next video frame is a decoding duration of the intra-frame coding frame; a second determining submodule 4022, configured to determine, when the frame type of the next video frame is a forward predictive coding frame, that the decoding duration of the next video frame is a decoding duration of the forward predictive coding frame; and a third determining submodule 4023, configured to determine, when the frame type of the next video frame is a bidirectional predictive interpolation coding frame, the decoding duration of the next video frame of the video frames according to a frame type of a video frame following the next video frame.

In some embodiments, the third determining submodule 4023 is configured to determine, when the frame type of the video frame following the next video frame of the video frames is an intra-frame coding frame, that the decoding duration of the next video frame of the video frames is a sum of a decoding duration of the intra-frame coding frame and a decoding duration of the bidirectional predictive interpolation coding frame; and determine, when the frame type of the video frame following the next video frame of the video frames is a forward predictive coding frame, that the decoding duration of the next video frame of the video frames is a sum of a decoding duration of the forward predictive coding frame and a decoding duration of the bidirectional predictive interpolation coding frame.

In some embodiments, the first determining module 403 includes: a fourth determining submodule 4031, configured to determine, based on the decoding duration of the next video frame, a preprocessing duration of the next video frame, and a first timestamp at which the video frames are stored in the first buffer area, a second timestamp at which the next video frame is stored in the first buffer area; a fifth determining submodule 4032, configured to determine a quantity of video frames in the first buffer area when the next video frame is stored in the first buffer area, and a duration for which the video frame processing model performs batch processing on the video frames in the first buffer area by using the quantity as the batch size; a sixth determining submodule 4033, configured to determine, based on the second timestamp and the duration, a third timestamp at which the video frame processing model completes batch processing on the video frames in the first buffer area by using the quantity as the batch size; and a seventh determining submodule 4034, configured to determine, if a difference between the third timestamp and a minimum timestamp at which preprocessing of the video frames in the first buffer area is completed when the next video frame is stored in the first buffer area is greater than or equal to a preset maximum processing duration of the video frame processing model, that the batch size of batch processing performed by the video frame processing model on the video frames in the first buffer area is the quantity.

In some embodiments, the first determining module 403 further includes: a waiting submodule 4035, configured to wait, if the difference is less than the maximum processing duration, for the video frame following the next video frame to be stored in the first buffer area, until a waiting duration is equal to a difference between the maximum processing duration and the difference.

The video stream processing apparatus of this embodiment is configured to implement corresponding video stream processing methods in the foregoing method embodiments, and also has beneficial effects of the corresponding method embodiments. Details are not repeated herein.

Figure 5:
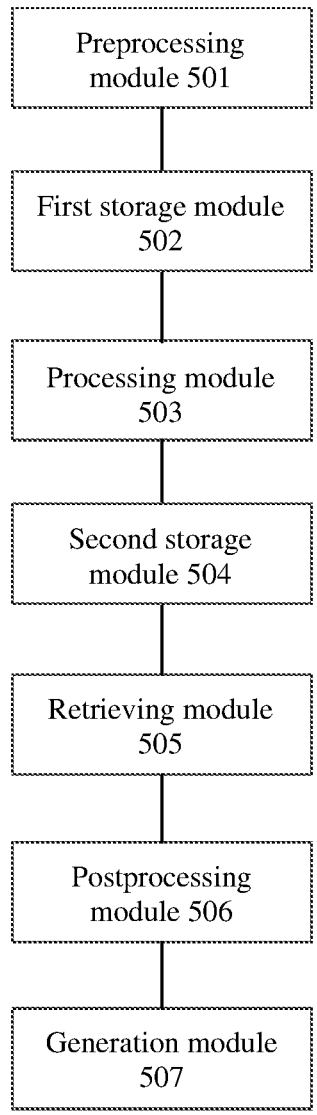
FIG. 5 is a schematic structural diagram of a video stream processing apparatus according to Embodiment 5 of this application.

FIG. 5 is a schematic structural diagram of a video stream processing apparatus according to Embodiment 5 of this application.

The video stream processing apparatus provided in this embodiment includes: a first storage module 502, configured to store video frames of an original video stream in a first buffer area by calling a video stream processing interface of a video stream processing tool; a processing module 503, configured to process the video frames in the first buffer area by using a video frame processing model, to obtain processed video frames; and a generation module 507, configured to generate, based on the processed video frames, a standard video stream corresponding to the original video stream.

In some embodiments, before the first storage module 502, the apparatus further includes: a preprocessing module 501, configured to preprocess the video frames of the original video stream, to obtain video frames adapted to the video frame processing model. The first storage module 502 is configured to: store the video frames adapted to the video frame processing model in the first buffer area.

In some embodiments, the preprocessing module 501 is configured to: preform value domain scaling on pixel values of pixel points in the video frames of the original video stream, to obtain the video frames adapted to the video frame processing model.

In some embodiments, after the processing module 503, the apparatus further includes: a second storage module 504, configured to store the batch-processed video frames in a second buffer area; a receiving module 505, configured to retrieve the batch-processed video frames from the second buffer area; and a postprocessing module 506, configured to postprocess the batch-processed video frames retrieved from the second buffer area, to recover a data format of the batch-processed video frames to a video image data format.

In some embodiments, the postprocessing module 506 is configured to: perform value domain scaling on pixel values of pixel points in the batch-processed video frames retrieved from the second buffer area, to recover the data format of the batch-processed video frames to the video image data format.

In some embodiments, the generation module 507 is configured to: encode the batch-processed video frames whose data format is recovered to the video image data format, to obtain the standard video stream corresponding to the original video stream.

The video stream processing apparatus of this embodiment is configured to implement corresponding video stream processing methods in the foregoing method embodiments, and also has beneficial effects of the corresponding method embodiments. Details are not repeated herein.

Figure 6:
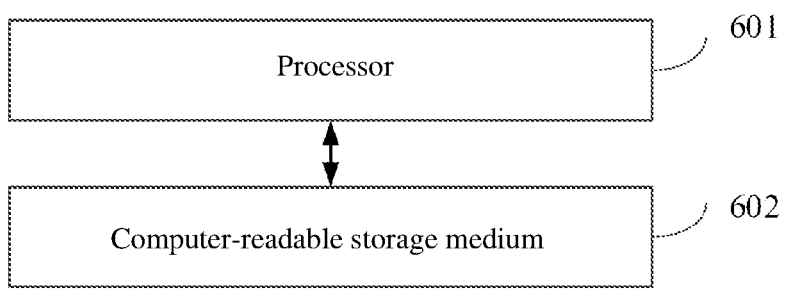
FIG. 6 is a schematic structural diagram of an electronic device according to Embodiment 6 of this application.

FIG. 6 is a schematic structural diagram of an electronic device according to Embodiment 6 of this application. The electronic device may include:

one or more processors 601; and a computer-readable medium 602, configured to store one or more programs, where the one or more programs, when executed by the one or more processors, cause the one or more processors to implement the video stream processing method according to Embodiment 1 or Embodiment 2.

Figure 7:
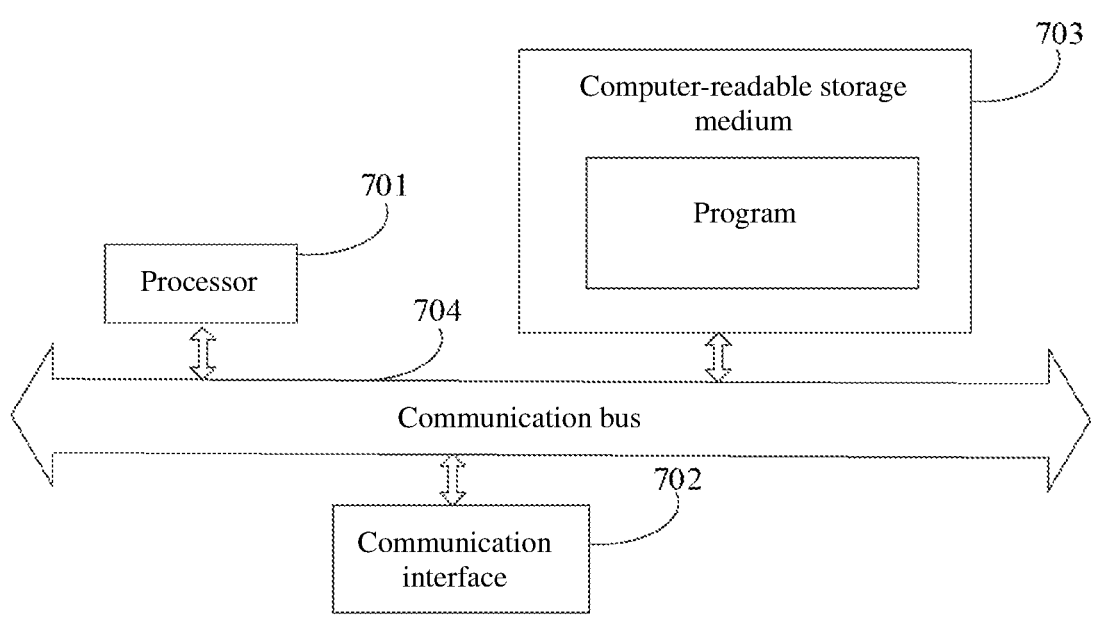
FIG. 7 is a hardware structure of an electronic device according to Embodiment 7 of this application.

FIG. 7 is a hardware structure of an electronic device according to Embodiment 7 of this application. As shown in FIG. 7, a hardware structure of the electronic device may include: a processor 701, a communication interface 702, a computer-readable medium 703, and a communication bus 704.

Communication among the processor 701, the communication interface 702, and the computer-readable medium 703 is implemented through the communication bus 704.

In some embodiments, the communication interface 702 may be an interface of a communication module, for example, an interface of a GSM module.

The processor 701 may be configured to: store video frames of an original video stream in a first buffer area by calling a video stream processing interface of a video stream processing tool; process the video frames in the first buffer area by using a video frame processing model, to obtain processed video frames; and generate, based on the processed video frames, a standard video stream corresponding to the original video stream.

The processor 701 may be a general purpose processor, including a central processing unit (CPU), a network processor (NP), or the like. The processor may alternatively be a digital signal processor (DSP), an application specific integrated circuit (ASIC), a field programmable gate array (FPGA), or another programmable logic device, discrete gate, or a transistor logic device, or a discrete hardware component. Disclosed methods, steps, and logic block diagrams in the embodiments of this application may be implemented or performed. The general-purpose processor may be a microprocessor, or the processor may be any conventional processor or the like.

The computer-readable medium 703 may be, but is not limited to, a random access memory (RAM), a read-only memory (ROM), a programmable read-only memory (PROM), an erasable programmable read-only memory (EPROM), an electrically erasable programmable read-only memory (EEPROM), or the like.

In particular, according to the embodiments of this application, the processes described above with reference to the flowchart may be implemented as a computer software program. For example, this embodiment of this application includes a computer program product, the computer program product includes a computer program carried on a computer-readable medium, and the computer program contains program code configured to perform the method shown in the flowchart. In such an embodiment, by using a communication part, the computer program may be downloaded and installed from a network, and/or installed from a removable medium. When the computer program is executed by the CPU, the foregoing functions defined in the method of this application are performed. It should be noted that, the computer-readable medium shown in this application may be a computer-readable signal medium or a computer-readable storage medium or any combination thereof. The computer-readable medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage medium, a magnetic storage medium, or any appropriate combination thereof. In this application, the computer-readable storage medium may be any tangible medium containing or storing a program, and the program may be used by or in combination with an instruction execution system, apparatus or component. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is configured by or configured in combination with an instruction execution system, apparatus, or device. The program code contained in the computer-readable medium may be transmitted by using any appropriate medium, including but not limited to: a wireless medium, a wire, an optical cable, RF, any suitable combination of the above, or the like.

One or more programming languages or any combination thereof may be configured to write the computer program code used for performing the operations in this application. The programming languages include, but are not limited to an object oriented programming language such as Java, Smalltalk, C++, or the like and a conventional procedural programming language, such as the "C" programming language or a similar programming language. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a LAN or a WAN, or may be connected to an external computer (for example, through the Internet by using an Internet service provider).

The flowcharts and block diagrams in the accompanying drawings illustrate possible system architectures, functions, and operations that may be implemented by a system, a method, and a computer program product according to various embodiments of this application. In this regard, each block in the flowchart or the block diagram may represent a module, a program segment, or a part of a code. The module, the program segment, or the part of the code contains one or more executable instructions for implementing a specified logical function. The above specific embodiments define specific sequences, but these sequences are only examples. During specific implementation, there may be fewer or more steps, or an execution order thereof may be adjusted. That is, in some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

The modules described in the embodiments of this application may be implemented in software or hardware. The modules may alternatively be disposed in a processor. For example, the processor may be described as: including a first storage module, a processing module, and a generation module. Names of the modules do not constitute a limitation on the modules in a specific case. For example, the first storage module may be further described as "a module for storing video frames of an original video stream in a first buffer area by calling a video stream processing interface of a video stream processing tool."

In another aspect, this application further provides a computer-readable medium, storing a computer program, where the program, when executed by a processor, implements the video stream processing method according to Embodiment 1 or Embodiment 2.

In another aspect, this application further provides a computer-readable medium. The computer-readable medium may be contained in the apparatus described in the above embodiments, or may exist alone without being assembled into the apparatus. The computer-readable medium carries one or more programs, and the one or more programs, when executed by the apparatus, cause the apparatus to: store video frames of an original video stream in a first buffer area by calling a video stream processing interface of a video stream processing tool; process the video frames in the first buffer area by using a video frame processing model, to obtain processed video frames; and generate, based on the processed video frames, a standard video stream corresponding to the original video stream.

The expression "first", "second", "the first", or "the second" as used in various embodiments of this application may modify various components regardless of order and/or importance, but these expressions do not limit corresponding components. The above expressions are only used for a purpose of distinguishing an element from other elements. For example, a first user device and a second user device are both user devices, but represent different user devices. For example, without departing from the scope of this application, a first element may be referred to as a second element, and similarly, the second element may be referred to as the first element.

When one element (such as the first element) is referred to as being "(operatively or communicatively) coupled" with another element (such as the second element), or being "(operatively or communicatively) coupled to" another element (such as the second element), or being "connected to" another element (such as the second element), it should be understood that the one element is directly connected to the another element, or the one element is indirectly connected to the another element via yet another element (such as a third element). In contrast, it may be understood that when one element (such as the first element) is referred to as being "directly connected" or "directly coupled" to another element (such as the second element), no element (such as the third element) is interposed between the two elements.

The foregoing descriptions are merely preferred embodiments of this application and descriptions of the technical principles used. A person skilled in the art should understand that the scope of this application is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in this application (but not limited thereto) are also included.

What is claimed is:

1. A video stream processing method, comprising:
   obtaining a video frame processing model trained to perform inferences on given video frames;
   preprocessing video frames of a first video stream to obtain video frames adapted to the video frame processing model;
   storing the video frames adapted to the video frame processing model in a first buffer area;
   determining, based on a decoding duration of a next video frame of the video frames, a batch size for batch processing the video frames in the first buffer area by the video frame processing model;
   processing the video frames in the first buffer area by using the video frame processing model according to the batch size to obtain processed video frames; and
   generating, based on the processed video frames, a second video stream corresponding to the first video stream.

2. The method according to claim 1, wherein the preprocessing the video frames of the first video stream comprises:
   preforming value domain scaling on pixel values of pixel points in the video frames of the first video stream, to obtain the video frames adapted to the video frame processing model.

3. The method according to claim 1, wherein before the determining the batch size for batch processing the video frames in the first buffer area, the method further comprises:
   determining, when decoding video frames in a group of pictures of the first video stream, the decoding duration of the next video frame according to information of the group of pictures.

4. The method according to claim 3, wherein the information of the group of pictures comprises a frame type of the next video frame of the video frames, and
   the determining the decoding duration of the next video frame according to information of the group of pictures comprises:
   determining, when the frame type of the next video frame is a first intra-frame coding frame, that the decoding duration of the next video frame is a decoding duration of the first intra-frame coding frame;
   determining, when the frame type of the next video frame is a first forward predictive coding frame, that the decoding duration of the next video frame is a decoding duration of the first forward predictive coding frame; and
   determining, when the frame type of the next video frame is a bidirectional predictive interpolation coding frame, the decoding duration of the next video frame of the video frames according to a frame type of a video frame following the next video frame.

5. The method according to claim 4, wherein the determining the decoding duration of the next video frame of the video frames according to the frame type of the video frame following the next video frame comprises:
   determining, when the frame type of the video frame following the next video frame of the video frames is a second intra-frame coding frame, that the decoding duration of the next video frame of the video frames is a sum of a decoding duration of the second intra-frame coding frame and a decoding duration of the bidirectional predictive interpolation coding frame; and determining, when the frame type of the video frame following the next video frame of the video frames is a second forward predictive coding frame, that the decoding duration of the next video frame of the video frames is a sum of a decoding duration of the second forward predictive coding frame and the decoding duration of the bidirectional predictive interpolation coding frame.

6. The method according to claim 1, wherein the determining, based on a decoding duration of a next video frame of the video frames, the batch size of batch processing performed by using the video frame processing model on the video frames in the first buffer area comprises:

determining, based on the decoding duration of the next video frame, a preprocessing duration of the next video frame, a first timestamp at which the video frames are stored in the first buffer area, and a second timestamp at which the next video frame is stored in the first buffer area;

determining a quantity of video frames in the first buffer area when the next video frame is stored in the first buffer area, and a duration for which the video frame processing model performs batch processing on the video frames in the first buffer area by using the quantity as the batch size;

determining, based on the second timestamp and the duration, a third timestamp at which the video frame processing model completes batch processing on the video frames in the first buffer area by using the quantity as the batch size; and determining that the batch size of batch processing performed by using the video frame processing model on the video frames in the first buffer area is the quantity, if a difference between the third timestamp and a minimum timestamp at which preprocessing of the video frames in the first buffer area is completed when the next video frame is stored in the first buffer area is greater than or equal to a maximum processing duration of the video frame processing model.

7. The method according to claim 6, further comprising:
waiting for the video frame following the next video frame to be stored in the first buffer area if the difference is less than the maximum processing duration.

8. The method according to claim 1, wherein after the performing batch processing on the video frames in the first buffer area by using the video frame processing model according to the determined batch size, the method further comprises:

storing the batch-processed video frames in a second buffer area;

retrieving the batch-processed video frames from the second buffer area; and postprocessing the batch-processed video frames retrieved from the second buffer area, to recover a data format of the batch-processed video frames to a video image data format.

9. The method according to claim 8, wherein the postprocessing the batch-processed video frames retrieved from the second buffer area comprises:

performing value domain scaling on pixel values of pixel points in the batch-processed video frames retrieved from the second buffer area, to recover the data format of the batch-processed video frames to the video image data format.

10. The method according to claim 8, wherein the generating, based on the processed video frames, a second video stream corresponding to the first video stream comprises:

encoding the batch-processed video frames whose data format is recovered to the video image data format, to obtain the second video stream corresponding to the first video stream.

11. A non-transitory computer-readable storage medium configured with instructions executable by one or more processors to cause the one or more processors to perform operations comprising:

obtaining a video frame processing model trained to perform inferences on given video frames;

preprocessing video frames of a first video stream to obtain video frames adapted to the video frame processing model;

storing the video frames adapted to the video frame processing model in a first buffer area;

determining, based on a decoding duration of a next video frame of the video frames, a batch size for batch processing the video frames in the first buffer area by the video frame processing model;

processing the video frames in the first buffer area by using the video frame processing model according to the batch size to obtain processed video frames; and generating, based on the processed video frames, a second video stream corresponding to the first video stream.

12. The non-transitory computer-readable storage medium of claim 11, wherein the preprocessing the video frames of the first video stream comprises:

preforming value domain scaling on pixel values of pixel points in the video frames of the first video stream, to obtain the video frames adapted to the video frame processing model.

13. The non-transitory computer-readable storage medium of claim 12, wherein before the determining the batch size for batch processing the video frames in the first buffer area, the operations further comprise:

determining, when decoding video frames in a group of pictures of the first video stream, the decoding duration of the next video frame according to information of the group of pictures.

14. The non-transitory computer-readable storage medium of claim 13, wherein the information of the group of pictures comprises a frame type of the next video frame of the video frames, and the determining the decoding duration of the next video frame according to information of the group of pictures comprises:

determining, when the frame type of the next video frame is an intra-frame coding frame, that the decoding duration of the next video frame is a decoding duration of the intra-frame coding frame;

determining, when the frame type of the next video frame is a forward predictive coding frame, that the decoding duration of the next video frame is a decoding duration of the forward predictive coding frame; and determining, when the frame type of the next video frame is a bidirectional predictive interpolation coding frame, the decoding duration of the next video frame of the video frames according to a frame type of a video frame following the next video frame.

15. The non-transitory computer-readable storage medium of claim 14, wherein the determining the decoding duration of the next video frame of the video frames according to the frame type of video frame following the next video frame comprises:

determining, when the frame type of the video frame following the next video frame of the video frames is an intra-frame coding frame, that the decoding duration of the next video frame of the video frames is a sum of a decoding duration of the intra-frame coding frame and a decoding duration of the bidirectional predictive interpolation coding frame; and determining, when the frame type of the video frame following the next video frame of the video frames is a forward predictive coding frame, that the decoding duration of the next video frame of the video frames is a sum of a decoding duration of the forward predictive coding frame and a decoding duration of the bidirectional predictive interpolation coding frame.

16. The non-transitory computer-readable storage medium of claim 15, wherein the determining the decoding duration of the next video frame of the video frames according to the frame type of the video frame following the next video frame comprises:

determining, when the frame type of the video frame following the next video frame of the video frames is a second intra-frame coding frame, that the decoding duration of the next video frame of the video frames is a sum of a decoding duration of the second intra-frame coding frame and a decoding duration of the bidirectional predictive interpolation coding frame; and determining, when the frame type of the video frame following the next video frame of the video frames is a second forward predictive coding frame, that the decoding duration of the next video frame of the video frames is a sum of a decoding duration of the second forward predictive coding frame and the decoding duration of the bidirectional predictive interpolation coding frame.

17. A system comprising one or more processors and one or more non-transitory computer-readable storage media storing instructions executable by the one or more processors to cause the system to perform operations comprising:

preprocessing video frames of a first video stream to obtain video frames adapted to the video frame processing model;

storing the video frames adapted to the video frame processing model in a first buffer area;

determining, based on a decoding duration of a next video frame of the video frames, a batch size for batch processing the video frames in the first buffer area by the video frame processing model;

processing the video frames in the first buffer area by using the video frame processing model according to the batch size to obtain processed video frames; and generating, based on the processed video frames, a second video stream corresponding to the first video stream.

18. The system of claim 17, wherein the preprocessing the video frames of the first video stream comprises:

preforming value domain scaling on pixel values of pixel points in the video frames of the first video stream, to obtain the video frames adapted to the video frame processing model.

\* \* \* \* \*